April 19, 1932.  H. W. LANDENBERGER  1,855,060
PRESSURE CONTROL SYSTEM
Filed April 29, 1930
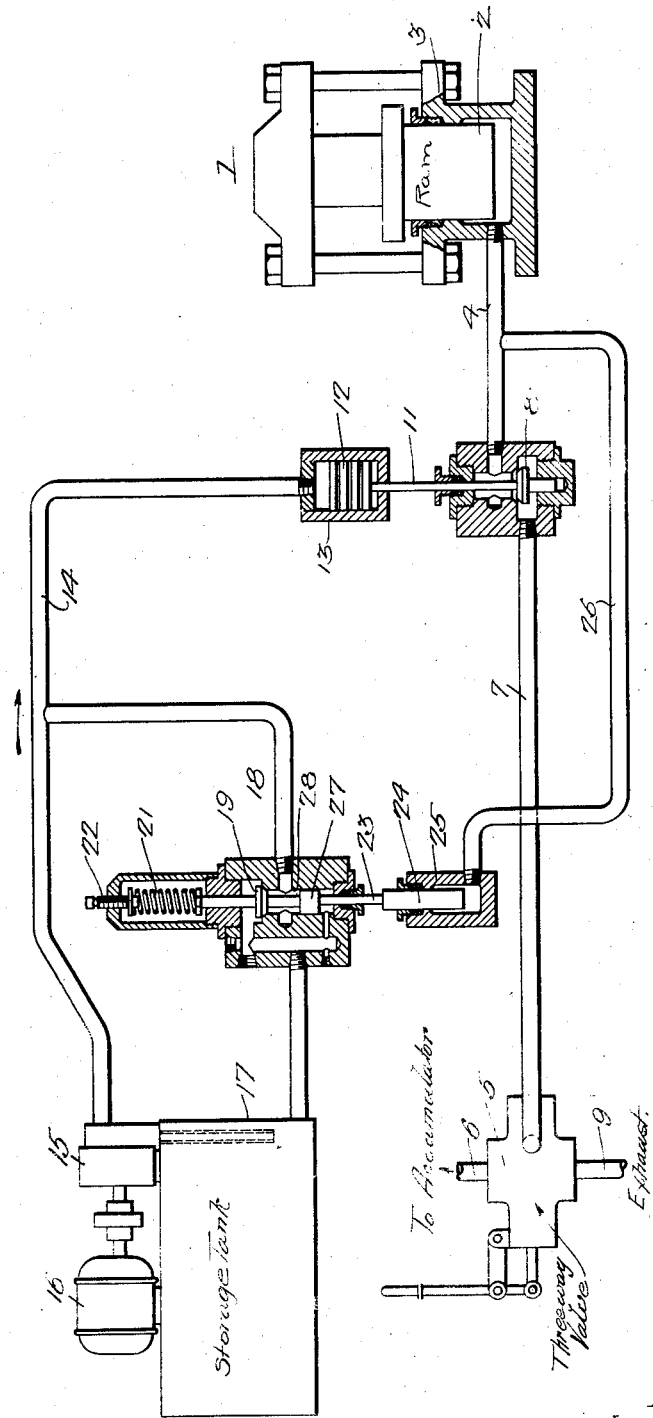
Inventor:
Henry W. Landenberger
by his Attorneys
Howson & Howson Patented Apr. 19, 1932

1,855,060

UNITED STATES PATENT OFFICE

HENRY W. LANDENBERGER, OF PHILADELPHIA, PENNSYLVANIA, ASSIGNOR TO AMERICAN FLUID MOTORS COMPANY, OF PHILADELPHIA, PENNSYLVANIA, A CORPORATION OF PENNSYLVANIA

PRESSURE CONTROL SYSTEM

Application filed April 29, 1930. Serial No. 448,318.

This invention relates to improvements in pressure-controlled systems and the principal object of the invention is to provide a novel, simple and efficient system for controlling and regulating fluid pressures supplied from a source to pressure mechanism such as hydraulic presses or the like.

In the attached drawings, I have illustrated diagrammatically a control system made in accordance with my invention.

With reference to the drawings, 1 is a hydraulic press comprising a ram 2 operating in a cylinder 3 to which fluid pressure is applied through a pipe 4. Fluid pressure for actuation of the ram is supplied to the cylinder 3 from an accumulator (not shown) through a pipe 6, a three-way valve 5, a pipe 7, and a valve 8 which controls the connection between the pipes 7 and 4. The three-way valve 5 affords means for connecting the pipe 7 either with the accumulator or an exhaust 9. When the pipe 7 is connected with the accumulator, fluid pressure tends to close the valve 8; and when the pipe 7 is connected with the exhaust, any pressure in the ram cylinder 3 will tend to move the valve from its seat.

The valve 8 is connected through a stem 11 with a piston 12 operating in a cylinder 13. This cylinder is connected through a pipe 14 with a variable discharge pump 15 which may be of the type disclosed in the United States Patent of Hele-Shaw and Martineau, No. 1,250,170. The pump 15 takes its suction from an oil storage tank 17 and a valve-controlled by-pass 18 is provided extending from the pipe 14 to the reservoir 17. The valve 19 controlling this by-pass is normally held to its seat by means of a spring 21, said spring being adjustable through a set screw 22 to vary the pressure tending to hold the valve to its seat. When the valve 19 is closed, the pump 15 builds up pressure through the pipe 14 in the cylinder 13. This pressure, through the piston 12, tending to hold open the valve 8. When the valve 19 is opened, pressure in the pipe 14 and cylinder 13 is released, thereby permitting the valve 8 to close under pressure applied through the pipe 7. The pump 15, which as previously set forth is of the variable discharge type, is preferably equipped with a pressure control which functions to reduce the discharge with increasing pressure to a predetermined minimum required for operation of the system as hereinafter set forth. A pump control device of this character is illustrated in the copending application of Landenberger and Link, Serial Number 367,001, filed May 29, 1929.

It will be noted that the stem 23 carries a cylindrical enlargement 27 which fits and operates in the lower end of the cylindrical chamber 28 of the valve 19. Pump pressure is applied to this chamber between the enlargement 27 and the disk of the valve 19, which disk normally closes the upper end of the said chamber. The valve is thus balanced as regards pump pressure so that the latter has no tendency either to seat or unseat the valve, the entire valve control being vested in the plunger 24 and the spring 21. Setting of the spring tension is therefore independent of the pump pressure, and regulation of the holding pressure on the ram 2 may be accurately accomplished by simple adjustment of the spring.

The stem 23 of the valve 19 projects downwardly and terminates in a plunger 24 which operates in a cylinder 25. This cylinder is connected through a pipe 26 with the pipe 4. Assuming the valve 8 to be open and the pipe 7 connected with the accumulator, pressure will be built up in the ram chamber 3 and pipe 4 and in the pipe 26 and cylinder 25 until the pressure reaches a point overcoming the pressure of the spring 21 whereupon the plunger 24 is forced outwardly of the cylinder and the valve 19 shifted from its seat.

The operation of the system is as follows: The three-way valve 5 is adjusted to connect the accumulator with the pipe 7, while the pump 15 operates to maintain the valve 8 in the open position, all parts being as shown in the drawings. Pressure is thereby built up in the ram cylinder and actuates the press. When pressure in the ram cylinder reaches a predetermined point, controlled by the adjustment of the spring 21, the plunger 24 is actuated to lift the valve 19 from its seat, thereby opening the valve 18 and immediately relieving the pump pressure in the cylinder 13. Release of pressure on the piston 12 permits the accumulator pressure in the pipe 7 to close the valve 8, thereby breaking the connection between the press and the accumulator.

Pressure is released from the press 1 by adjusting the three-way valve 5 to connect the pipe 7 with the discharge 9. The release of pressure in the pipe 7 permits the pressure in the ram cylinder 3 to again open the valve 8. The resultant loss of pressure in the pipe 4 and on plunger 24 permits the spring 21 to return the valve 19 to its seat, thereby breaking the by-pass 18 and causing the pump 15 again to build up pressure in the pipe 14, which pressure acts through the piston 12 to retain the valve 8 in the open position. The valve 5 may now be readjusted to connect the accumulator with the pipe 7 whereby the cycle described above will be repeated.

By the foregoing apparatus, it will be apparent that the pressure applied to the press 1 may be regulated from the maximum obtainable from the accumulator to any lower pressure desired within the range of the spring 21.

I claim:

1. The combination with a main fluid system, of a fluid pressure generator associated with said system, a valve for controlling the connection between the system and said generator and adapted to be closed by fluid passed into the system from the generator, a secondary fluid system, a fluid pressure generator associated therewith, and means actuated by pressure in said secondary system for retaining the said valve in open position, a by-pass in said secondary system whereby fluid pressure from the generator may be diverted from said valve-retaining means to permit said valve to close, a second valve controlling said bypass, adjustable pressure means for normally retaining said valve closed, and means actuated by pressure in the primary system for opening said second bypass valve against the closing pressure.

2. The combination with a main fluid system, of a fluid pressure generator connected therewith, a valve for controlling the connection between the said system and generator and adapted normally to be closed by fluid passing into said system from the generator, a secondary fluid system, a variable discharge fluid pressure generator associated with said secondary system and adapted for automatic control by pressure in the system whereby as said pressure in the secondary system increases the rate of discharge of the said variable generator is decreased, means operative by pressure in the secondary system for retaining the said valve in open position, a bypass in the secondary system providing for diversion of the generator pressure from the said valve-retaining means thereby permitting the valve to close, a second valve controlling said bypass, means normally retaining the valve closed, and means actuated by pressure in the main fluid system for opening said bypass valve.

3. The combination with a primary fluid system, of a fluid pressure generator connected with said system, a valve controlling the connection between the system and the generator and adapted normally to be closed by fluid passing into the system from said generator, a secondary fluid system including a fluid pump, a tank with which the suction of said pump is connected, means actuated by pressure from the pump for retaining the said valve in the open position, and a bypass whereby fluid pressure may be diverted from said valve-retaining means thereby permitting the valve to close, a valve for controlling said bypass, means normally retaining said valve closed, and means actuated by pressure in the primary system for opening said bypass valve.

4. The combination with a main fluid system, of a fluid pressure generator associated with said system, a check valve tending normally to prevent flow of fluid from the generator to the system, a valve controlling the connection of said system with the generator and with exhaust and operative in different positions of adjustment to connect the system with said generator and exhaust respectively, a secondary fluid system including a working cylinder, a piston in said cylinder operatively connected with said check valve, a fluid pressure generator associated with the secondary system for supplying fluid to the cylinder to hold the check valve open against the fluid pressure in the main system, a bypass for the generator of the secondary system through which pressure in the cylinder is relieved to permit the check valve to close, a balanced valve controlling the by-pass, a spring normally holding said by-pass valve closed, a working cylinder connected to the main fluid system, and a piston in said cylinder connected with the by-pass valve and operative to open said valve at a predetermined pressure in the main system.

5. The combination with a main fluid system, of a fluid pressure generator associated with said system, a check valve tending normally to prevent flow of fluid from the generator to the system, a valve controlling the connection of said system with the generator and exhaust, a secondary fluid system including fluid-actuated means for holding said check valve open, a positive-displacement variable-discharge pump for supplying fluid pressure to the secondary system, said pump having means for automatically reducing the rate of discharge of said pump as the pressure in the secondary system increases, a by-pass for said pump through which fluid pressure is diverted from said fluid-actuated means to permit the check valve to close, a valve controlling said by-pass and pressure means for normally holding said by-pass valve closed, and fluid-actuated means associated with the main fluid system for opening the by-pass valve when the pressure in the main system rises to a predetermined maximum.

HENRY W. LANDENBERGER.